US009208988B2

(12) United States Patent
Morton et al.

(10) Patent No.: US 9,208,988 B2
(45) Date of Patent: Dec. 8, 2015

(54) GRAPHITE BACKSCATTERED ELECTRON SHIELD FOR USE IN AN X-RAY TUBE

(71) Applicant: Rapiscan Systems, Inc., Torrance, CA (US)

(72) Inventors: Edward James Morton, Guildford (GB); Russell David Luggar, Dorking (GB); Paul De Antonis, Horsham (GB)

(73) Assignee: Rapiscan Systems, Inc., Torrance, CA (US)

( * ) Notice: Subject to any disclaimer, the term of this patent is extended or adjusted under 35 U.S.C. 154(b) by 184 days.

(21) Appl. No.: 13/674,086

(22) Filed: Nov. 11, 2012

(65) Prior Publication Data

US 2014/0133635 A1 May 15, 2014

(51) Int. Cl.
*G01J 5/18* (2006.01)
*H01J 35/08* (2006.01)

(52) U.S. Cl.
CPC ........... *H01J 35/08* (2013.01); *H01J 2235/168* (2013.01)

(58) Field of Classification Search
USPC ......... 378/119, 121, 137, 138, 140, 142, 143, 378/161, 210
See application file for complete search history.

(56) References Cited

U.S. PATENT DOCUMENTS 2,101,143 A 12/1937 Laidig
2,333,525 A 11/1943 Cox
2,842,694 A * 7/1958 Hosemann .................... 378/138
2,952,790 A 9/1960 Steen
3,138,729 A 6/1964 Henke
3,239,706 A 3/1966 Farrell
3,610,994 A * 10/1971 Sheldon ........................ 313/421
3,768,645 A 10/1973 Conway
4,045,672 A 8/1977 Watanabe
4,057,725 A 11/1977 Wagner
4,064,411 A 12/1977 Iwasaki
4,105,922 A 8/1978 Lambert
4,171,254 A 10/1979 Koenecke
4,228,353 A 10/1980 Johnson
4,241,404 A 12/1980 Lux
4,259,721 A 3/1981 Kuznia
4,266,425 A 5/1981 Allport
4,274,005 A 6/1981 Yamamura
4,309,637 A * 1/1982 Fetter ............................ 378/130
4,340,816 A 7/1982 Schott (Continued)

FOREIGN PATENT DOCUMENTS

CN 1138743 A 12/1996
CN 1172952 A 2/1998

(Continued)

OTHER PUBLICATIONS

International Search Report, PCT/GB2004/001732, Feb. 25, 2005.

(Continued)

*Primary Examiner* — Bernard E Souw
(74) *Attorney, Agent, or Firm* — Novel IP

(57) ABSTRACT

The present invention is a shielded anode having an anode with a surface facing an electron beam and a shield configured to encompass the anode surface. The shield has at least one aperture and an internal surface facing the anode surface. The shield internal surface and anode surface are separated by a gap in the range of 1 mm to 10 mm. The shield of the present invention is fabricated from a material, such as graphite, that is substantially transmissive to X-ray photons.

20 Claims, 2 Drawing Sheets

(56) References Cited

U.S. PATENT DOCUMENTS 4,344,011 A 8/1982 Hayashi
4,352,021 A 9/1982 Boyd
4,352,196 A * 9/1982 Gabbay ........................ 378/135
4,420,382 A 12/1983 Riedl
4,468,802 A 8/1984 Friedel
4,531,226 A 7/1985 Peschmann
4,625,324 A 11/1986 Blaskis
4,670,895 A 6/1987 Penato
4,672,649 A 6/1987 Rutt
4,675,890 A 6/1987 Plessis
4,677,651 A 6/1987 Hartl
4,719,645 A 1/1988 Yamabe
4,736,400 A 4/1988 Koller
4,763,345 A 8/1988 Barbaric
RE32,961 E 6/1989 Wagner
4,866,745 A 9/1989 Akai
4,868,856 A 9/1989 Frith
4,887,604 A 12/1989 Shefer
4,894,775 A 1/1990 Kritchman
4,991,194 A 2/1991 Laurent
5,033,106 A 7/1991 Kita
5,065,418 A 11/1991 Bermbach
5,068,882 A 11/1991 Eberhard
5,073,910 A 12/1991 Eberhard
5,091,924 A 2/1992 Bermbach
5,091,927 A 2/1992 Golitzer
5,159,234 A 10/1992 Wegmann
5,191,600 A 3/1993 Vincent
5,195,112 A 3/1993 Vincent
5,247,556 A 9/1993 Eckert
5,259,014 A 11/1993 Brettschneider
5,268,955 A 12/1993 Burke
5,272,627 A 12/1993 Maschhoff
5,305,363 A 4/1994 Burke
5,313,511 A 5/1994 Annis
5,329,180 A 7/1994 Popli
5,367,552 A 11/1994 Peschmann
5,375,156 A 12/1994 Kuo-Petravic
5,414,622 A 5/1995 Walters
5,467,377 A 11/1995 Dawson
5,511,104 A 4/1996 Mueller
5,515,414 A 5/1996 dAchardVanEnschut
5,541,975 A 7/1996 Anderson
5,568,829 A 10/1996 Crawford
5,596,621 A 1/1997 Schwarz
5,600,700 A 2/1997 Krug
5,604,778 A 2/1997 Polacin
5,633,907 A 5/1997 Gravelle
5,654,995 A 8/1997 Flohr
5,680,432 A 10/1997 Voss
5,689,541 A 11/1997 Schardt
5,712,889 A 1/1998 Lanzara
5,798,972 A 8/1998 Lao
5,841,831 A 11/1998 Hell
5,859,891 A 1/1999 Hibbard
5,879,807 A 3/1999 Inoue et al.
5,889,833 A 3/1999 Silver
5,907,593 A 5/1999 Hsieh
5,966,422 A 10/1999 Dafni
5,974,111 A 10/1999 Krug
5,987,097 A 11/1999 Salasoo
6,014,419 A 1/2000 Hu
6,018,562 A 1/2000 Willson
6,075,836 A 6/2000 Ning
6,088,426 A 7/2000 Miller
6,108,575 A 8/2000 Besson
6,122,343 A 9/2000 Pidcock
6,130,502 A 10/2000 Kobayashi
6,181,765 B1 1/2001 Sribar
6,183,139 B1 2/2001 Solomon
6,188,747 B1 2/2001 Geus
6,218,943 B1 4/2001 Ellenbogen
6,229,870 B1 5/2001 Morgan
6,236,709 B1 5/2001 Perry
6,240,157 B1 5/2001 Danielsson
6,269,142 B1 7/2001 Smith
6,298,110 B1 10/2001 Ning
6,324,243 B1 11/2001 Edic
6,324,249 B1 11/2001 Fazzio
6,341,154 B1 1/2002 Besson
6,404,230 B1 6/2002 Cairns
6,449,331 B1 9/2002 Nutt
6,470,065 B1 10/2002 Lauther
6,480,571 B1 11/2002 Andrews
6,546,072 B1 4/2003 Chalmers
6,553,096 B1 4/2003 Zhou
6,556,653 B2 4/2003 Hussein
6,580,780 B1 6/2003 Miller
6,624,425 B2 9/2003 Nisius
6,674,838 B1 1/2004 Barrett
6,721,387 B1 4/2004 Naidu
6,751,293 B1 6/2004 Barrett
6,760,407 B2 7/2004 Price et al.
6,785,359 B2 8/2004 Lemaitre
6,819,742 B1 11/2004 Miller
6,975,698 B2 12/2005 Katcha
6,993,115 B2 1/2006 McGuire et al.
7,079,624 B1 7/2006 Miller
7,184,520 B1 2/2007 Sano
7,192,031 B2 3/2007 Dunham et al.
7,197,116 B2 3/2007 Dunham
7,203,269 B2 4/2007 Huber
7,218,700 B2 5/2007 Huber et al.
7,233,644 B1 6/2007 Bendahan
7,248,673 B2 7/2007 Miller
7,466,799 B2 * 12/2008 Miller .......................... 378/140
7,664,230 B2 2/2010 Morton
7,728,397 B2 6/2010 Gorrell
8,094,784 B2 1/2012 Morton
8,243,876 B2 8/2012 Morton
8,331,535 B2 * 12/2012 Morton et al. ................ 378/140
8,654,924 B2 * 2/2014 Behling .......................... 378/91
2001/0022346 A1 9/2001 Katagami et al.
2001/0033635 A1 10/2001 Kuwabara et al.
2002/0031202 A1 3/2002 Callerame
2002/0082492 A1 6/2002 Grzeszczuk
2002/0094064 A1 7/2002 Zhou
2002/0097836 A1 7/2002 Grodzins
2002/0140336 A1 10/2002 Stoner
2002/0176531 A1 11/2002 McClelland
2003/0021377 A1 1/2003 Turner et al.
2003/0031352 A1 2/2003 Nelson
2003/0043957 A1 3/2003 Pelc
2003/0048868 A1 3/2003 Bailey
2003/0076921 A1 4/2003 Mihara
2003/0076924 A1 4/2003 Mario
2003/0091148 A1 5/2003 Bittner et al.
2004/0022292 A1 2/2004 Morton et al.
2004/0057554 A1 3/2004 Bjorkholm
2004/0066879 A1 4/2004 Machida
2004/0094064 A1 5/2004 Taguchi
2004/0120454 A1 6/2004 Ellenbogan
2004/0202282 A1 * 10/2004 Miller .......................... 378/140
2004/0213378 A1 10/2004 Zhou et al.
2004/0252807 A1 12/2004 Skatter
2004/0258305 A1 12/2004 Burnham
2005/0002492 A1 1/2005 Rother
2005/0031075 A1 2/2005 Hopkins
2005/0053189 A1 3/2005 Gohno
2005/0058242 A1 3/2005 Peschmann
2005/0100135 A1 5/2005 Lowman
2005/0105682 A1 5/2005 Heumann
2005/0111610 A1 5/2005 De Man et al.
2005/0123092 A1 6/2005 Mistretta
2005/0157925 A1 7/2005 Lorenz
2005/0175151 A1 8/2005 Dunham
2005/0276377 A1 12/2005 Carol
2005/0276382 A1 12/2005 Lesiak
2006/0050842 A1 3/2006 Wang
2006/0233297 A1 10/2006 Ishiyama
2007/0053495 A1 3/2007 Morton et al.
2007/0064873 A1 3/2007 Gabioud
2007/0172023 A1 7/2007 Morton
2007/0183575 A1 8/2007 Lemaitre

(56) References Cited

U.S. PATENT DOCUMENTS

| | | | | |
|---|---|---|---|---|
| 2007/0297570 | A1 | 12/2007 | Kerpershoek | |
| 2008/0019483 | A1 | 1/2008 | Andrews et al. | |
| 2008/0043920 | A1 | 2/2008 | Liu | |
| 2008/0056436 | A1 | 3/2008 | Pack | |
| 2008/0056437 | A1 | 3/2008 | Pack | |
| 2008/0112540 | A1* | 5/2008 | Rogers | 378/203 |
| 2008/0123803 | A1 | 5/2008 | DeMan | |
| 2008/0130974 | A1 | 6/2008 | Xu | |
| 2009/0022264 | A1 | 1/2009 | Zhou | |
| 2009/0097836 | A1 | 4/2009 | Tanaka | |
| 2009/0159451 | A1 | 6/2009 | Tomantschger et al. | |
| 2009/0185660 | A1 | 7/2009 | Zou et al. | |
| 2010/0046716 | A1* | 2/2010 | Freudenberger | 378/140 |
| 2010/0111265 | A1 | 5/2010 | Holm | |
| 2010/0246754 | A1 | 9/2010 | Morton | |
| 2010/0316192 | A1 | 12/2010 | Hauttmann | |
| 2011/0007876 | A1* | 1/2011 | Morton et al. | 378/137 |
| 2011/0188725 | A1 | 8/2011 | Yu | |
| 2011/0222662 | A1* | 9/2011 | Behling | 378/91 |
| 2013/0156161 | A1* | 6/2013 | Andrews | 378/140 |
| 2013/0195253 | A1* | 8/2013 | Andrews | 378/138 |

FOREIGN PATENT DOCUMENTS

| | | | |
|---|---|---|---|
| CN | 1194718 | | 9/1998 |
| CN | 1795527 | A | 6/2006 |
| DE | 2729353 | A1 | 1/1979 |
| DE | 3638378 | | 5/1988 |
| DE | 3840398 | A1 | 6/1989 |
| DE | 4432205 | C1 | 1/1996 |
| DE | 4425691 | A1 | 2/1996 |
| DE | 19745998 | A1 | 3/1999 |
| DE | 10036210 | A1 | 11/2001 |
| DE | 10319547 | | 11/2004 |
| DE | 10319549 | B3 | 12/2004 |
| EP | 0142249 | A2 | 5/1985 |
| EP | 0432568 | | 6/1991 |
| EP | 0531993 | A1 | 3/1993 |
| EP | 0584871 | A1 | 3/1994 |
| EP | 0924742 | A2 | 6/1999 |
| EP | 0930046 | A2 | 7/1999 |
| EP | 1277439 | A1 | 1/2003 |
| EP | 1374776 | A1 | 1/2004 |
| EP | 1558142 | A1 | 8/2005 |
| FR | 2328280 | A1 | 5/1977 |
| FR | 2675629 | A1 | 10/1992 |
| GB | 1149796 | A | 4/1969 |
| GB | 1272498 | A | 4/1972 |
| GB | 1497396 | A | 1/1978 |
| GB | 1526041 | A | 9/1978 |
| GB | 2015245 | A | 9/1979 |
| GB | 2089109 | A | 6/1982 |
| GB | 2212903 | A | 8/1989 |
| GB | 2212975 | A | 8/1989 |
| GB | 2360405 | A | 9/2001 |
| GB | 2418529 | A | 3/2006 |
| JO | 570175247 | | 10/1982 |
| JP | 50081080 | A | 7/1975 |
| JP | S51055286 | | 5/1976 |
| JP | S51078696 | | 7/1976 |
| JP | S52050186 | | 4/1977 |
| JP | S52124890 | | 10/1977 |
| JP | H5493993 | | 7/1979 |
| JP | S55046408 | | 4/1980 |
| JP | 56086448 | | 7/1981 |
| JP | S56167464 | | 12/1981 |
| JP | S5717524 | A | 1/1982 |
| JP | S57110854 | | 7/1982 |
| JP | S57175247 | A | 10/1982 |
| JP | 58212045 | A | 12/1983 |
| JP | 590016254 | A | 1/1984 |
| JP | S591625 | A | 1/1984 |
| JP | S5916254 | A | 1/1984 |
| JP | 59075549 | | 4/1984 |
| JP | S5975549 | A | 4/1984 |
| JP | 600015546 | | 1/1985 |
| JP | S601554 | A | 1/1985 |
| JP | S602144 | | 1/1985 |
| JP | 600021440 | | 2/1985 |
| JP | S6038957 | A | 2/1985 |
| JP | S60181851 | | 12/1985 |
| JP | 61107642 | | 5/1986 |
| JP | 62044940 | A | 2/1987 |
| JP | S62121773 | | 8/1987 |
| JP | 63016535 | | 1/1988 |
| JP | 1296544 | A | 11/1989 |
| JP | 03198975 | | 8/1991 |
| JP | H0479128 | A | 3/1992 |
| JP | H04319237 | | 11/1992 |
| JP | H05135721 | A | 6/1993 |
| JP | H05182617 | A | 7/1993 |
| JP | H05290768 | A | 11/1993 |
| JP | 060038957 | | 2/1994 |
| JP | H0638957 | A | 2/1994 |
| JP | 06162974 | | 6/1994 |
| JP | H06261895 | | 9/1994 |
| JP | H07093525 | | 4/1995 |
| JP | H09171788 | | 6/1997 |
| JP | H10211196 | A | 8/1998 |
| JP | H10272128 | | 10/1998 |
| JP | H11500229 | | 1/1999 |
| JP | H11273597 | | 10/1999 |
| JP | 2000175895 | | 6/2000 |
| JP | 2001023557 | | 1/2001 |
| JP | 2001502473 | | 2/2001 |
| JP | 2001176408 | A | 6/2001 |
| JP | 2001204723 | | 7/2001 |
| JP | 2002343291 | | 11/2002 |
| JP | 2003092076 | | 3/2003 |
| JP | 2003121392 | | 4/2003 |
| JP | 2003126075 | A | 5/2003 |
| JP | 2003257347 | | 9/2003 |
| JP | 2004000605 | A | 1/2004 |
| JP | 2004079128 | A | 3/2004 |
| JP | 2004311245 | | 11/2004 |
| JP | 2005013768 | A | 1/2005 |
| JP | 2006128137 | | 5/2006 |
| JP | 2006351272 | A | 12/2006 |
| JP | 2007265981 | | 10/2007 |
| JP | 2008166059 | A | 7/2008 |
| JP | 100211196 | | 9/2010 |
| SU | 1022236 | A1 | 6/1983 |
| WO | 9528715 | A2 | 10/1995 |
| WO | 9718462 | A1 | 5/1997 |
| WO | 9960387 | A2 | 11/1999 |
| WO | 0231857 | | 4/2002 |
| WO | 03051201 | A2 | 6/2003 |
| WO | 2004010127 | | 1/2004 |
| WO | 2004042769 | A1 | 5/2004 |
| WO | 2004097386 | A1 | 11/2004 |
| WO | 2004097888 | A2 | 11/2004 |
| WO | 2004097889 | A2 | 11/2004 |
| WO | 2006130630 | A2 | 12/2006 |
| WO | 2007068933 | | 6/2007 |
| WO | 2008068691 | | 6/2008 |
| WO | 2009012453 | A1 | 1/2009 |
| WO | 2010086653 | | 8/2010 |
| WO | 2010141659 | A1 | 12/2010 |
| WO | PCT/US10/37167 | | 12/2010 |

OTHER PUBLICATIONS

International Search Report, PCT/GB2004/001747, Aug. 10, 2004.
International Search Report, PCT/GB2004/001729, Aug. 12, 2004, Rapiscan Systems, Inc.
Second office action for Japanese Application No. JP2012-514109 mailed on Oct. 20, 2014.
International Search Report, PCT/US2010/41871, Jan. 20, 2011, Rapiscan Systems, Inc.
Notice of Allowance dated Jan. 30, 2015 for U.S. Appl. No. 13/405,117.
Bruder et al. "Efficient Extended Field of View (eFOV) Reconstructuion Techniques for Multi-Slice Helical CT", Medical

(56) References Cited

OTHER PUBLICATIONS

Imaging 2008: Physics of Medical Imaging, edited by Jiang Hsieh, Ehsan Samei, Proc. of SPIE VOI. 6913, 69132E, (2008).
Chinese Patent Application No. 200980114807.X, Second Office Action, Nov. 21, 2013.
Great Britain Patent Application No. GB0816823.9, Search Report, Oct. 20, 2009.
Great Britain Patent Application No. GB1104148.0, Examination Report, Mar. 29, 2011.
International Search Report, PCT/GB2004/001741, Mar. 3, 2005.
International Search Report, PCT/GB2004/001731, May 27, 2005.
International Search Report, PCT/GB2004/001751, Mar. 21, 2005.
International Search Report, PCT/GB2009/001760, Jan. 21, 2010, Rapiscan Systems, Inc.
STMicroelectronics, "Dual Full-Bridge Driver", Datasheet for L298, 2000, pp. 1-13, XP002593095.
Notice of Allowance dated Dec. 4, 2014 for U.S. Appl. No. 13/313,854.
Office Action dated Nov. 26, 2014 for U.S. Appl. No. 13/146,645.
Office Action dated Oct. 30, 2014 for U.S. Appl. No. 13/054,066.
Supplementary European Search Report, EP10784058, Dec. 6, 2013.
European Search Opinion, EP10784058, Dec. 18, 2013.
US 5,987,079, 11/1999, Scott (withdrawn)

* cited by examiner

GRAPHITE BACKSCATTERED ELECTRON SHIELD FOR USE IN AN X-RAY TUBE

CROSS-REFERENCE TO RELATED APPLICATIONS

The present application is a continuation of U.S. patent application Ser. No. 12/792,931 (the "'931 Application"), filed on Jun. 3, 2010, which relies on U.S. Patent Provisional Application No. 61/183,591 filed on Jun. 3, 2009, for priority.

The '931 Application is also a continuation-in-part of U.S. patent application Ser. No. 12/485,897, filed on Jun. 16, 2009, which is a continuation of U.S. patent application Ser. No. 10/554,656, filed on Oct. 25, 2005, and now issued U.S. Pat. No. 7,564,939, which is a 371 national stage application of PCT/GB04/01729, filed on Apr. 23, 2004 and which, in turn, relies on Great Britain Application No. 0309387.9, filed on Apr. 25, 2003, for priority.

The '931 Application is also a continuation-in-part of U.S. patent application Ser. No. 12/371,853, filed on Feb. 16, 2009, which is a continuation of U.S. patent application Ser. No. 10/554,975, filed on Oct. 25, 2005, and now issued U.S. Pat. No. 7,512,215, which is a 371 national stage application of PCT/GB2004/01741, filed on Apr. 23, 2004 and which, in turn, relies on Great Britain Application Number 0309383.8, filed on Apr. 25, 2003, for priority.

The '931 Application is also a continuation-in-part of U.S. patent application Ser. No. 12/651,479, filed on Jan. 3, 2010, which is a continuation of U.S. patent application Ser. No. 10/554,654, filed on Oct. 25, 2005, and now issued U.S. Pat. No. 7,664,230, which is a 371 national stage application of PCT/GB2004/001731, filed on Apr. 23, 2004 and which, in turn, relies on Great Britain Patent Application Number 0309371.3, filed on Apr. 25, 2003, for priority.

The '931 Application is also a continuation-in-part of U.S. patent application Ser. No. 12/364,067, filed on Feb. 2, 2009, which is a continuation of U.S. patent application Ser. No. 12/033,035, filed on Feb. 19, 2008, and now issued U.S. Pat. No. 7,505,563, which is a continuation of U.S. patent application Ser. No. 10/554,569, filed on Oct. 25, 2005, and now issued U.S. Pat. No. 7,349,525, which is a 371 national stage filing of PCT/GB04/001732, filed on Apr. 23, 2004 and which, in turn, relies on Great Britain Patent Application Number 0309374.7, filed on Apr. 25, 2003, for priority.

The '931 Application is also a continuation-in-part of U.S. patent application Ser. No. 12/758,764, filed on Apr. 12, 2010, which is a continuation of U.S. patent application Ser. No. 12/211,219, filed on Sep. 16, 2008, and now issued U.S. Pat. No. 7,724,868, which is a continuation of U.S. patent Ser. No. 10/554,655, filed on Oct. 25, 2005, and now issued U.S. Pat. No. 7,440,543, which is a 371 national stage application of PCT/GB2004/001751, filed on Apr. 23, 2004, and which, in turn, relies on Great Britain Patent Application Number 0309385.3, filed on Apr. 25, 2003, for priority.

The '931 Application is also a continuation-in-part of U.S. patent application Ser. No. 12/697,073, filed on Jan. 29, 2010, which is a continuation of U.S. patent application Ser. No. 10/554,570, filed on Oct. 25, 2005, and now issued U.S. Pat. No. 7,684,538, which is a 371 national stage application of PCT/GB2004/001747, filed on Apr. 23, 2004, and which, in turn, relies on Great Britain Patent Application Number 0309379.6, filed on Apr. 25, 2003, for priority.

The '931 Application is also a continuation-in-part of U.S. patent application Ser. No. 12/097,422, filed on Jun. 13, 2008, and U.S. patent application Ser. No. 12/142,005, filed on Jun. 19, 2008, both of which are 371 national stage applications of PCT/GB2006/004684, filed on Dec. 15, 2006, which, in turn, relies on Great Britain Patent Application Number 0525593.0, filed on Dec. 16, 2005, for priority.

The '931 Application is also a continuation-in-part of U.S. patent application Ser. No. 12/478,757, filed on Jun. 4, 2009, which is a continuation of U.S. patent application Ser. No. 12/364,067, filed on Feb. 2, 2009, which is a continuation of U.S. patent application Ser. No. 12/033,035, filed on Feb. 19, 2008, and now issued U.S. Pat. No. 7,505,563, which is a continuation of U.S. patent application Ser. No. 10/554,569, filed on Oct. 25, 2005, and now issued U.S. Pat. No. 7,349,525, which is a 371 national stage filing of PCT/GB04/001732, filed on Apr. 23, 2004 and which, in turn, relies on Great Britain Patent Application Number 0309374.7, filed on Apr. 25, 2003, for priority. In addition, U.S. Patent Application number relies on Great Britain Patent Application Number 0812864.7, filed on Jul. 15, 2008, for priority.

The '931 Application is also a continuation-in part of U.S. patent application Ser. No. 12/712,476, filed on Feb. 25, 2010, which relies on U.S. Provisional Patent Application No. 61/155,572 filed on Feb. 26, 2009 and Great Britain Patent Application No. 0903198.0 filed on Feb. 25, 2009, for priority.

Each of the aforementioned PCT, foreign, and U.S. applications, and any applications related thereto, is herein incorporated by reference in their entirety.

FIELD OF THE INVENTION

The present invention relates generally to the field of X-ray tubes. In particular, the present invention relates to a backscattered electron shield for use in an X-ray tube, where the shield is made of graphite.

BACKGROUND OF THE INVENTION

In an X-ray tube, electrons are accelerated from a cathode by an applied voltage and subsequently collide with an anode. During the collision, the electrons interact with the anode and generate X-rays at the point of impact. In addition to X-ray generation, electrons may be backscattered out of the anode back into the X-ray tube vacuum. Up to 50% of the incident electrons may undergo such backscattering. The consequence of this backscattering is that electrical charge can be deposited on surfaces within the tube which, if not dissipated, can result in high voltage instability and potential tube failure.

Thus, what is needed is an apparatus and method for preventing electrons from leaving the anode and entering the X-ray tube vacuum. What is also needed is an apparatus and method for reducing the amount of backscattered electrons leaving the anode area that still allows free access of the incident electrons to the anode and does not impact the resultant X-ray flux.

SUMMARY OF THE INVENTION

In one embodiment, the present invention is directed toward a shielded anode comprising: an anode having a surface facing an electron beam and a shield configured to encompass said surface, wherein said shield has at least one aperture, wherein said shield has an internal surface facing said anode surface, and wherein said shield internal surface and said anode surface are separated by a gap. The gap is in the range of 1 mm to 10 mm, 1 mm to 2 mm, or 5 mm to 10 mm. The shield comprises graphite. The shield is removably attached to said anode. The shield comprises a material that has at least 95% transmission for X-ray photons. The shield comprises a material that has at least 98% transmission for X-ray photons. The shield comprises a material that blocks and absorbs backscattered electrons. The shielded anode further comprises more than one aperture.

In another embodiment, the present invention is directed toward a shielded anode comprising an anode having a length and a surface facing an electron beam; and a shield configured to encompass said surface, wherein said shield has at least one aperture, wherein said shield has an internal surface facing said anode surface, and wherein said shield internal surface and said anode surface are separated by a distance, wherein said distance varies along the length of the anode. The gap is in the range of 1 mm to 10 mm, 1 mm to 2 mm or 5 mm to 10 mm. The shield comprises graphite. The shield is removably attached to said anode. The shield comprises a material that has at least 95% transmission for X-ray photons. The shield comprises a material that has at least 98% transmission for X-ray photons. The shield comprises a material that blocks and absorbs backscattered electrons. The shielded anode further comprises more than one aperture.

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION OF THE INVENTION

The present invention is directed towards an apparatus and method for preventing electrons, generated in an X-ray tube, from leaving an anode and entering the X-ray tube vacuum.

The present invention is also directed towards an apparatus and method for reducing the amount of backscattered electrons leaving the anode area that a) still allows free access of the incident electrons to the anode and b) does not impact the resultant X-ray flux.

In one embodiment, the present invention is directed towards a shield that can be attached to an anode while still allowing free access of incident electrons to the anode, wherein the shield is made of any material that will absorb or repel backscattered electrons while still permitting X-ray photons to pass through.

In one embodiment, the present invention is directed towards a pyrolitic graphite shield that can be attached to an anode while still allowing free access of incident electrons to the anode.

Thus, in one embodiment, the present invention is directed towards an anode shield that has relatively little impact on the resultant X-ray flux and a significant effect on reducing the amount of backscattered electrons leaving the anode area.

In one embodiment, the graphite shield is fixedly attached to the anode. In another embodiment, the graphite shield is removably attached to the anode. In one embodiment, the pyrolitic graphite shield is attached to a linear anode which operates in association with multiple electron sources to produce a scanning X-ray source. In another embodiment, the pyrolitic graphite shield is attached to a linear anode which operates in association with a single source X-ray tube.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Figure 1:
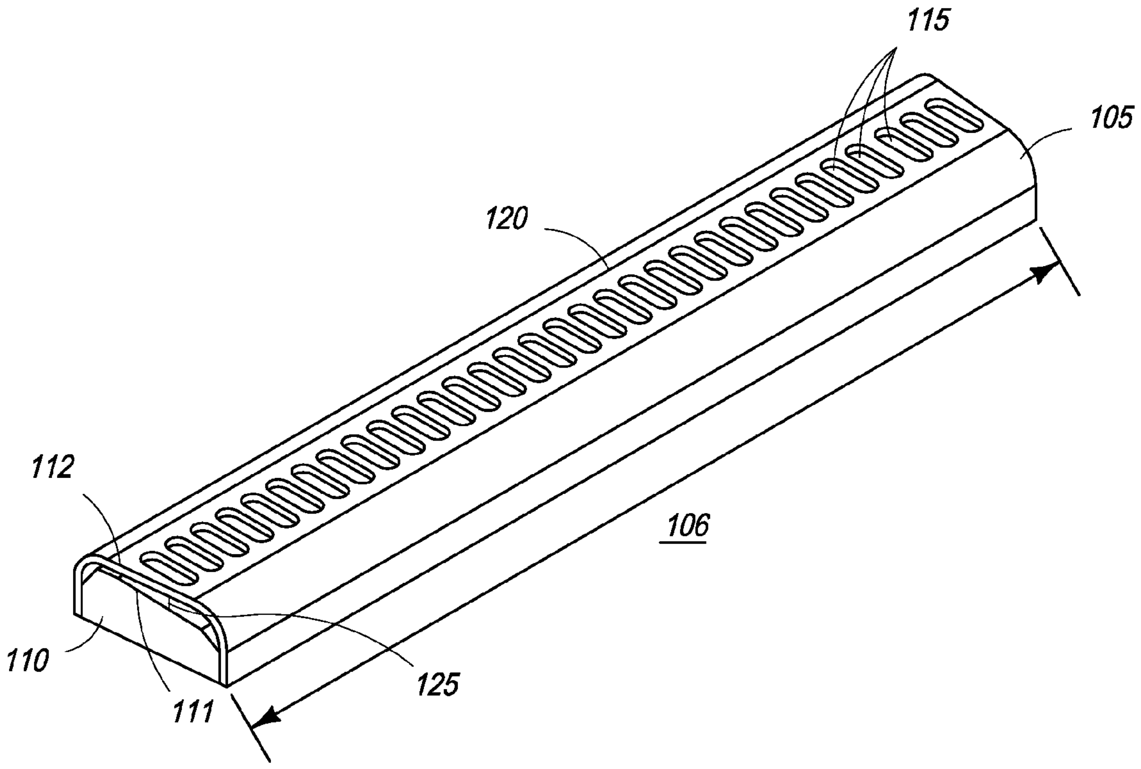
FIG. 1 is an illustration of an electron backscatter shield fitted over a linear multiple target X-ray anode.

FIG. 1 is an illustration of an electron backscatter shield fitted over a linear multiple target X-ray anode. Referring to FIG. 1, a graphite electron backscatter shield 105 is fitted over a linear multiple target X-ray anode 110. In one embodiment, the graphite shield is fixedly attached to the anode. In another embodiment, the graphite shield is removably attached to the anode.

In one embodiment, shield 105 is configured to fit over the linear length 106 of anode 110 and has at least one and preferably multiple apertures 115 cut into and defined by front face 120 to permit free fluence of the incident electron beam. X-rays, generated by the fluence of electrons incident upon the anode 110, pass through the graphite shield 105 essentially unhindered. Backscattered electrons will not be able to pass through the graphite shield 105 and are thus, collected by the shield which, in one embodiment, is electrically coupled to the body of the anode 110.

Figure 2:
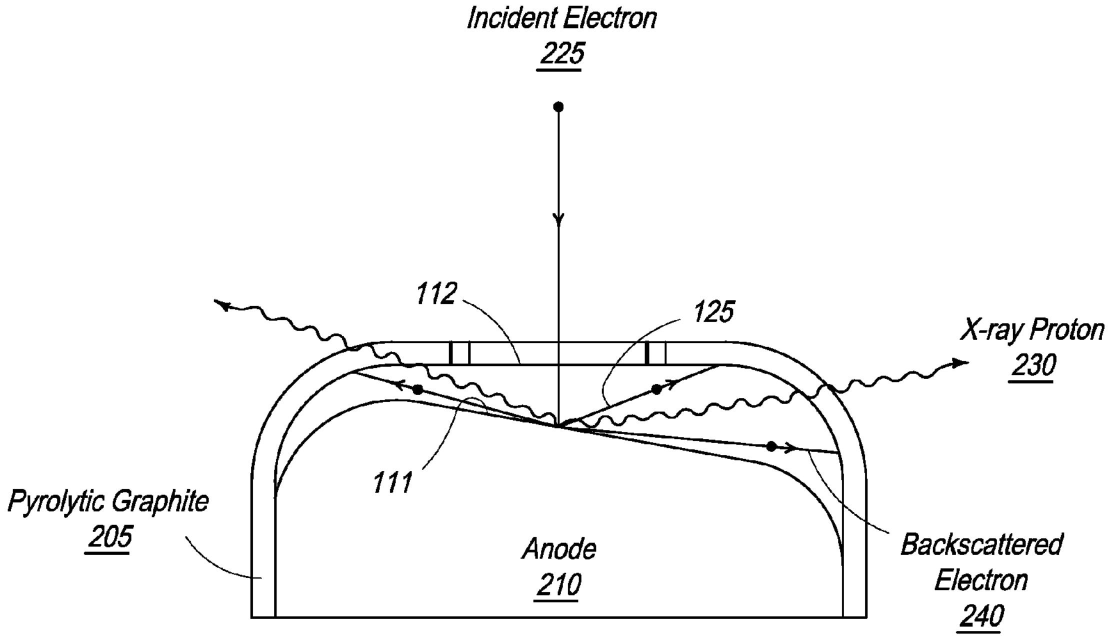
FIG. 2 is a schematic diagram showing the operation of a backscatter electron shield in accordance with the present invention.

In one embodiment, the anode 110 has a surface 111 that faces, and is therefore directly exposed to, the electron beam. In one embodiment, the shield 105 has an internal surface 112 that faces the anode surface 111. In one embodiment, the internal surface 112 and said anode surface 111 are separated by a gap 125. The distance or gap 125 between the surface 111 of anode 110 and internal surface 112 of shield 105 is in the range of 1 mm to 10 mm. In one embodiment, the distance or gap 125 between the surface 111 of anode 110 and internal surface 112 of shield 105 is in the range of 1 mm to 2 mm. In one embodiment, the distance or gap 125 between the surface 111 of anode 110 and internal surface 112 of shield 105 is in the range of 5 mm to 10 mm. FIG. 2 shows distance 125 between the surface 111 of the anode and internal surface 112 of the shield in another view. It should be appreciated that, as shown in FIG. 2, the distance between the internal shield surface and the anode surface varies along the length of the anode surface.

Referring back to FIG. 1, in one embodiment, X-ray generation in the shield 105 (either by incident or backscattered electrons) will be minimized due to the low atomic number (Z) of graphite (Z=6). Electrons that are backscattered directly towards at least one aperture 115 will be able to exit the shield. In one embodiment, electron exit is minimized by standing the shield away from the anode surface and thus reducing the solid angle that the aperture subtends at the X-ray focal spot.

FIG. 2 is a schematic diagram showing the operation of the backscatter electron shield. Anode 210 is covered by electron shield 205, which permits incident electrons 225 to pass unimpeded (and thereby produce X-rays). The shield 205 allows the transmission of X-ray photons through the shield material, but it blocks and absorbs backscattered electrons 240, thereby preventing their entry into the X-ray tube vacuum.

In one embodiment, shield 205 is formed from graphite. Graphite is advantageous in that it will stop backscattered electrons but will neither produce x-rays in the graphite (which would otherwise blur the focal spot and ultimately the image) nor attenuate the x-rays that are produced from the correct part of the anode (focal spot). Electrons with 160 kV energy have a range of 0.25 mm in graphite and therefore a shield 1 mm thick will prevent any electrons passing through the graphite. However, X-ray photon transmission, in one embodiment, for X-ray photons having an energy of 160 kV, is greater than 90%. X-ray photon transmission, in another embodiment, for X-ray photons having an energy of 160 kV, is preferably greater than 95%. X-ray photon transmission, in another embodiment, for X-ray photons having an energy of 160 kV, is preferably at least 98%.

Graphite is electrically conductive and the charge will therefore dissipate to the anode 210. It is also refractory and can withstand any temperature it might reach either during processing or operation. In one embodiment, the shield can be grown onto a former and the apertures laser cut to the required size.

In other embodiments, any material that is electrically conductive and can withstand manufacturing temperature can be employed, including, but not limited to metallic materials such as stainless steel, copper, or titanium. It should be noted herein and understood by those of ordinary skill in the art that considerations for material choice also include cost and manufacturability.

While there has been illustrated and described what is at present considered to be one embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

We claim:

1. A method of minimizing a backscattering of electrons from an anode surface toward an electron source, wherein the electron source is configured to direct a stream of electrons toward the anode surface, comprising positioning a shield around said anode surface, wherein said shield is configured to not block electrons transmitted in a direct line from said electron source to the anode surface, wherein said shield is configured to block electrons backscattered from the anode surface at an angle relative to said direct line, and wherein said shield comprises a material is at least 90% transmissive to X-ray photons.

2. The method of claim 1 wherein said shield and said anode surface are separated by a gap.

3. The method of claim 1 wherein said gap is in the range of 1 mm to 10 mm.

4. The method of claim 1 wherein said gap is in the range of 1 mm to 2 mm.

5. The method of claim 1 wherein said gap is in the range of 5 mm to 10 mm.

6. The method of claim 1 wherein said shield comprises graphite.

7. The method of claim 1 wherein said shield is removably attached to said anode.

8. The method of claim 1 wherein said shield comprises a material that has at least 95% transmission for X-ray photons.

9. The method of claim 1 wherein said shield comprises a material that has at least 98% transmission for X-ray photons.

10. The method of claim 1 wherein said shield comprises a material that blocks and absorbs backscattered electrons.

11. The method of claim 1 wherein said shield comprises more than one aperture.

12. A method of minimizing a backscattering of electrons from an anode surface toward an electron source, wherein the electron source is configured to direct a stream of electrons toward an anode surface through an aperture in said shield, comprising positioning a shield around said anode surface, wherein said aperture is configured to pass electrons transmitted in a direct line from said electron source through to the anode surface, wherein said shield is configured to block electrons backscattered from the anode surface at an angle relative to said direct line, and wherein said shield comprises a material is at least 90% transmissive to X-ray photons.

13. The method of claim 12 wherein said shield and said anode surface are separated by a gap.

14. The method of claim 13 wherein a size of the gap varies along a length of the anode.

15. The method of claim 12 wherein said gap is in the range of 1 mm to 10 mm.

16. The method of claim 12 wherein said gap is in the range of 5 mm to 10 mm.

17. The method of claim 12 wherein said shield comprises graphite.

18. The method of claim 12 wherein said shield is removably attached to said anode.

19. The method of claim 12 wherein said shield comprises a material that has at least 95% transmission for X-ray photons.

20. The method of claim 12 wherein said shield comprises a material that has at least 98% transmission for X-ray photons.

* * * * *